United States Patent Office 2,715,563
Patented Aug. 16, 1955

2,715,563

PROCESS FOR THE PRODUCTION OF AMMONIUM SULPHAMATE

Joseph Newton Robinson and Frederick John Leslie Miller, Trail, British Columbia, and Basil McDonnell, Rossland, British Columbia, Canada, assignors to The Consolidated Mining and Smelting Company of Canada, Limited, Montreal, Quebec, Canada, a company of Canada No Drawing. Application April 17, 1951,
Serial No. 221,534

8 Claims. (Cl. 23—114)

This invention relates to the production of ammonium sulphamate from ammonia and sulphur dioxide.

We have found that ammonia and sulphur dioxide can be reacted at elevated temperatures and pressures to produce high yields of ammonium sulphamate. The process appears to involve a series of consecutive complex reactions but may be represented by the following overall reaction:

$$4NH_3 + 3SO_2 \rightarrow S + 2NH_4SO_3NH_2 \qquad (1)$$

The process of the present invention involves, in general, the step of reacting ammonia and sulphur dioxide in a pressure vessel, suvh as an autoclave, under conditions of temperature, pressure and time of retention described in detail hereinafter, to produce a reaction mixture consisting essentially of ammonium sulphamate, a minor amount of sulphur, and, usually, a small amount of ammonium sulphate. The ammonium sulphamate can be recovered very easily from this reaction mixture as a crystalline product of high purity.

Gaseous ammonia and gaseous sulphur dioxide can be employed in the process of the present invention. It is preferred to employ liquid ammonia and liquid sulphur dioxide. The reactants should be substantially anhydrous to prevent or restrict the formation of undesirable by-products, such as ammonium sulphate. In some cases, it may be desirable to dry the ammonia and sulphur dioxide to reduce the moisture content of the reactants before passing them into the pressure vessel.

The process can be operated within the temperature range of from about 100° C. to about 400° C. At temperatures below about 100° C., compounds yielding excessive quantities of ammonium sulphite and ammonium thiosulphate in aqueous solution are formed. At temperatures above about 400° C., ammonium sulphamate decomposes rapidly to produce ammonium sulphate, sulphur and nitrogen, as represented by the following equation:

$$4NH_4SO_3NH_2 \rightarrow 3(NH_4)_2SO_4 + S + N_2 \qquad (2)$$

It is preferred to operate the process within the range of from about 200° C. to about 300° C. Satisfactory yields of ammonium sulphamate may be obtained within the temperature range of from 100° C. to 200° C. but on dissolving the reaction product in water, ammonium sulphite and ammonium thiosulphate may be formed from intermediate compounds produced within this temperature range. The presence of ammonium sulphite and ammonium thiosulphate complicates the purification step for recovery of ammonium sulphamate from the reaction product. At temperatures above 300° C. the reaction period for satisfactory yields of ammonium sulphamate is very short, from about 2 to 5 minutes or less, and above about 400° C. the formation and decomposition of ammonium sulphamate occur too rapidly for normal commercial operations.

The time of retention of the reaction mixture in the pressure vessel to obtain the maximum yield of ammonium sulphamate may vary from hours to seconds, depending upon the temperature at which the reaction is conducted. Within the preferred temperature range of from about 200° C. to about 300° C., the reaction period may vary from a range of fifteen minutes to six hours or more at the lower temperature to a range of from two to ten minutes at the upper temperature. For example, it has been found that at about 200° C. the reaction product, after a reaction period of twenty minutes, contained about 70% ammonium sulphamate and after six hours about 84% ammonium sulphamate; at about 240° C., the percentage was about 84% after fifteen minutes of operation and about 68% after ninety minutes; and at 300° C., the percentages for four, six and eight minutes were 83%, 82% and 82%, respectively; at 350° C., the percentages for two, four and six minutes were 83%, 55% and 46%, respectively. These results were obtained with an ammonia pressure in the reaction vessel of about 500 pounds per square inch.

Pressure of ammonia also is an important factor in the operation of the process and the presence of ammonia in excess of the stoichiometric requirements for reaction with the sulphur dioxide must be employed to provide the required pressure conditions. An excess of ammonia is necessary to prevent the formation of undesirable by-products, such as diammonium imido disulphate, $NH(SO_3NH_4)_2$ which reduces, to the extent that it is formed, the yield of ammonium sulphamate and complicates the purification step for the recovery of ammonium sulphamate. Also, this diammonium imido disulphate has a high melting point and is difficult to remove from the reaction vessel.

The minimum ammonia pressure employed in the process, therefore, should be sufficient to prevent the formation of diammonium imido disulphate. For operating temperatures up to about 225° C., ammonia pressures of about 200 pounds per square inch are satisfactory, and for temperatures between 225° C. and 300° C. ammonia pressures of about 500 pounds per square inch are satisfactory. Higher pressures can be employed but lower pressures may result in the formation of the undesired by-products and a lower yield of ammonium sulphamate. For example, at 225° C. and with a retention period of about thirty minutes, the reaction product contained 76% ammonium sulphamate and 3.7% diammonium imido disulphate when an ammonia pressure of 100 pounds per square inch was employed. Operating at 200 pounds per square inch under the same conditions, the reaction products contained 82.4% ammonium sulphamate and no diammonium imido disulphate. The process has been operated with ammonia pressures up to 6000 pounds per square inch with satisfactory results but such high pressures are unnecessary and uneconomical. It is preferred to use an ammonia pressure of the order of about 500 pounds per square inch when operating within the preferred temperature range of from about 200° C. to 300° C.

The use of an excess of ammonia results in additional incidental advantages in the operation of the process. The process is strongly exothermic and by using excess ammonia the reaction temperature can be controlled readily by evaporating ammonia in the pressure vessel, or by continuously passing liquid ammonia into the pressure vessel and withdrawing gaseous ammonia therefrom. The ammonia vapour from the vessel may, of course, be recovered for further use. It is not necessary, therefore, to complicate the construction of the reaction vessel with cooling coils or other temperature control equipment. Also, the reaction mixture is very corrosive and, ordinarily, stainless steel is not satisfactory for use in direct contact with the hot reaction mixture. By controlling the temperature with excess ammonia, the need for heat transfer is eliminated and the reaction vessel can be lined with glass or bricks.

As the outer metal wall of the reaction vessel can be kept relatively cool under these conditions, corrosion difficulties are greatly reduced.

The use of an excess of sulphur dioxide over that stoichiometric amount required for reaction with the ammonia results in the formation of undesirable by-products, with a consequent reduction in the yield of ammonium sulphamate and, consequently, is to be avoided.

As a specific example of the operation of the process of the present invention, 102 grams of liquid sulphur dioxide and 95 grams of liquid ammonia were charged into an autoclave of 1000 cc. capacity. The stoichiometric quantity of ammonia actually required for reaction with the sulphur dioxide would be 36 grams. The contents of the autoclave were heated to about 250° C. under an ammonia pressure of about 380 pounds per square inch maintained by a throttle valve arrangement through which ammonia vapour was released as required to maintain the desired pressure. After a period of thirty minutes, the autoclave was cooled and the pressure was released. The reaction product weighed 138 grams and analysed 82.6% ammonium sulphamate, 12.0% sulphur and 6.5% ammonium sulphate. The yield corresponded to 95% of the theoretical amount of ammonium sulphamate, based on the maximum yield obtainable from the sulphur content of the sulphur dioxide charged to the autoclave according to Reaction 1.

The reaction product was leached at about 40° C. with a solution of ammonium sulphamate saturated with ammonium sulphamate at 20° C. Suspended sulphur was removed from the solution by filtration at about 40° C. and the filtered solution was cooled to 20° C., at which temperature pure ammonium sulphamate crystals were precipitated from the solution and recovered by filtration. The solution recovered from this last filtration step was retained for use in further leaching steps. As the reaction product is molten at temperatures above about 130° C., the contents of the autoclave may be easily discharged directly into a bath of the leaching solution.

A small amount of ammonium sulphate is usually present in the reaction product. The presence of ammonium sulphate may be attributed to the hydrolysis of ammonium sulphamate, or other compound, during the course of the reaction, or during the course of analysis, or to decomposition of ammonium sulphamate according to Reaction 2, or of some other compound. As both the reactants are very hygroscopic and commercial grades of ammonia and sulphur dioxide are not completely anhydrous, it is not unlikely that a small amount of ammonium sulphamate hydrolyses to form ammonium sulphate during the reaction.

Any ammonium sulphate formed during the reaction is dissolved in the ammonium sulphamate dissolving solution. On cooling the filtered solution to about 20° C., pure ammonium sulphamate crystallizes and precipitates from the solution and may be separated from the solution by filtration. Any ammonium sulphate present in the solution is still soluble at the filtration temperature and remains in the dissolving solution. In order to prevent accumulation of ammonium sulphate in this solution, a portion of the solution may be discarded at intervals or treated separately for the recovery of ammonium sulphate.

The method of the present invention possesses a number of important advantages. Very high yields of ammonium sulphamate may be recovered from the reaction, the reaction mixture is substantially free from undesirable by-products and the ammonium sulphamate may be separated readily from the reaction product and recovered in a high state of purity. While elevated temperatures and superatmospheric pressures are employed, they may be maintained easily within reasonable limits and costly high pressure equipment is not required. The reactants are readily available in commercial grades and at reasonable cost and no difficulty is encountered in their storage and manipulation.

It will be understood, of course, that modifications may be made in the preferred embodiment of the invention described herein without departing from the scope of the invention defined by the appended claims.

What we claim as new and desire to protect by Letters Patent of the United States is:

1. The process of producing ammonium sulphamate which includes the steps of reacting a mixture of ammonia and sulphur dioxide substantially free from sulphur trioxide at a temperature within the range of from about 100° C. to about 400° C. and under a superatmospheric pressure of ammonia, the ammonia being present in excess of the amount required for reaction with the sulphur dioxide, and recovering ammonium sulphamate from the reaction product.

2. The process of producing ammonium sulphamate which includes the steps of reacting a mixture of ammonia and sulphur dioxide substantially free from sulphur trioxide at a temperature within the range of from about 200° C. to about 300° C. and under a superatmospheric pressure of ammonia, the ammonia being present in excess of the amount required for reaction with the sulphur dioxide, and recovering ammonium sulphamate from the reaction product.

3. The process of producing ammonium sulphamate which includes the steps of reacting a mixture of ammonia and sulphur dioxide substantially free from sulphur trioxide at a temperature within the range of from about 200° C. to about 300° C. under a pressure of ammonia within the range of from about 200 to about 500 pounds per square inch, the ammonia being present in excess of the amount required for reaction with the sulphur dioxide, and recovering ammonium sulphamate from the reaction product.

4. The process of producing ammonium sulphamate which includes the steps of reacting a mixture of ammonia and sulphur dioxide substantially free from sulphur trioxide at a temperature above about 100° C. and under a superatmospheric pressure of ammonia, the ammonia being present in excess of the amount required for reaction with the sulphur dioxide, and recovering ammonium sulphamate from the reaction product.

5. The process of producing ammonium sulphamate which includes the steps of reacting a mixture of ammonia and sulphur dioxide substantially free from moisture, said mixture being substantially free from sulphur trioxide, under superatmospheric pressure of ammonia and at a temperature within the range of from about 100° C. to about 400° C., the ammonia being present in amount in excess of the amount required for reaction with the sulphur dioxide, and recovering ammonium sulphamate from the reaction product.

6. The process of producing ammonium sulphamate which includes the steps of reacting a mixture of ammonia and sulphur dioxide substantially free from moisture, said mixture being substantially free from sulphur trioxide, under superatmospheric pressure of ammonia and at a temperature within the range of from about 200° C. to about 300° C., the ammonia being present in excess of the amount required for reaction with the sulphur dioxide, dissolving the water soluble constituents of the reaction product in an aqueous ammonium sulphamate solution, filtering the solution to separate the water insoluble solids therefrom, and cooling the solution to precipitate crystalline ammonium sulphamate.

7. The process of producing ammonium sulphamate which comprises the step of reacting a mixture of ammonia and sulphur dioxide substantially free from moisture, said mixture being substantially free from sulphur trioxide, under a pressure of ammonia of at least 200 pounds per square inch and at a temperature within the range of from about 100° C. to about 400° C., the ammonia being present in excess of the amount required for reaction with the sulphur dioxide, and recovering ammonium sulphamate from the reaction product.

8. The process of producing ammonium sulphamate which includes the steps of reacting ammonia and substantially pure sulfur dioxide at a temperature above about 100° C. and under a superatmospheric pressure of ammonia the ammonia being present in excess of the amount required for reaction with the sulfur dioxide, and recovering ammonium sulphamate from the reaction product.

References Cited in the file of this patent

UNITED STATES PATENTS 2,514,955   Kamlet _____ July 11, 1950

FOREIGN PATENTS 647,316   Great Britain _____ Dec. 13, 1950

OTHER REFERENCES

Perry, Chemical Engineer's Handbook, 1941, 2d ed. McGraw Hill Book Co. pages 2550–2551.

J. W. Mellor: "Inorganic and Theoretical Chemistry," vol. 8, 1928, pages 632, 633. Longmans, Green and Co., New York, publishers.